United States Patent

Brandt et al.

[11] Patent Number: 5,110,770
[45] Date of Patent: May 5, 1992

[54] CERAMIC CUTTING TOOL MATERIAL WITH IMPROVED TOUGHNESS

[75] Inventors: Nils G. L. Brandt, Solna; Anders G. Thelin, Vällingby, both of Sweden

[73] Assignee: Sandvik AB, Sandviken, Sweden

[21] Appl. No.: 723,241

[22] Filed: Jun. 28, 1991

Related U.S. Application Data

[63] Continuation of Ser. No. 201,737, Jun. 3, 1988, abandoned.

[30] Foreign Application Priority Data

Jun. 9, 1987 [SE] Sweden ............................ 8702390

[51] Int. Cl.$^5$ ............................................ C04B 35/56
[52] U.S. Cl. ........................................ 501/89; 501/92; 501/127; 51/309
[58] Field of Search ........................... 501/89, 92, 127; 51/307, 309

[56] References Cited

U.S. PATENT DOCUMENTS

| | | | |
|---|---|---|---|
| 4,218,253 | 8/1980 | Dworak et al. | 501/91 |
| 4,543,345 | 9/1985 | Wei | 501/91 |
| 4,657,877 | 4/1987 | Becher et al. | 501/89 |
| 4,745,091 | 5/1988 | Landingham | 501/87 |
| 4,789,277 | 12/1988 | Rhodes et al. | 501/89 |
| 4,804,645 | 2/1989 | Ekstrom | 501/105 |
| 4,849,381 | 7/1989 | Brandt et al. | 501/89 |
| 4,920,838 | 5/1990 | Brandt et al. | 501/95 |

*Primary Examiner*—Mark L. Bell
*Assistant Examiner*—Deborah Jones
*Attorney, Agent, or Firm*—Burns, Doane, Swecker & Mathis

[57] ABSTRACT

This invention relates to a cutting tool material with improved toughness behavior using alumina or silicon nitride as the matrix material. The improved toughness is achieved by the addition of whiskers and optionally zirconia in a monoclinic or tetragonal phase, to the matrix. The whiskers are disc-shaped with a thickness of 0.5-8 μm and an equivalent diameter (hypothetical diameter of a circle with the same area as the disc) of about 5-50 μm.

4 Claims, No Drawings

CERAMIC CUTTING TOOL MATERIAL WITH IMPROVED TOUGHNESS

This application is a continuation of application Ser. No. 201,737, filed Jun. 3, 1988, now abandoned.

The present invention relates to a cutting tool material. More specifically, the present invention relates to a cutting tool material exhibiting excellent toughness.

A cutting tool edge is subjected to fluctuating stresses and temperatures of dynamic nature with peak temperatures exceeding 1000° C. and average rake face stresses of up to 150 MPa. There exists also steep temperature and stress gradients in the cutting edge. As a consequence of the dynamic conditions described above several failure mechanisms operate simultaneously. For a given set of cutting data, however, one mechanism usually dominates, leading to tool failure.

One objective of the present invention is to obtain a cutting tool material with better toughness behavior for some applications than heretofore known cutting tool materials.

Known toughening mechanisms in cutting tool materials include transformation toughening, which utilizes a phase transformation of $ZrO_2$-particles dispersed in a ceramic matrix, this type of material is described in U.S. Pat. No. 4,218,253; and whisker reinforcement which utilizes the bridging effect of small diameter (typically 0.6 $\mu$m), high aspect ratio and high strength single crystal whiskers in a ceramic matrix as described in U.S. Pat. No. 4,543,345 and the combined effect of $ZrO_2$ and small diameter SiC-whisker as described in U.S. Pat. No. 4,657,877.

Both of these effects have led to substantial improvements of the toughness behavior in certain metal cutting operations. However, the search for greater improvements in the properties of cutting tools is continuously ongoing.

Disc-shaped single crystals have also been used to increase toughness and thermal shock resistance of ceramic materials.

SU 298569 discloses a material with discs of beta-$Al_2O_3$, 70-90 weight-%, in alpha-$Al_2O_3$ which shows an improved toughness compared to alpha-$Al_2O_3$. SU 421674 discloses a material with discs of $Cr_2O_3$ in a $ZrO_2$-matrix. SU 487863 is similar to SU 421674 using discs of $Cr_2O_3$ (thickness 2-10 $\mu$m, diameter 100-500 $\mu$m) in $Al_2O_3$. SU 526606 discloses a material with discs of beta-$Al_2O_3$ in a matrix of alpha-$Al_2O_3$ and Al showing increased toughness and thermal shock resistance.

It has now surprisingly been found that additions of 5-35 weight-% disc-shaped single crystals with an equivalent diameter (hypothetical diameter of a circle with the same area as the disc) of 5-50 $\mu$m preferably 5-40 $\mu$m and a thickness of 0.5-8 preferably 0.5-6 $\mu$m homogeneously dispersed in the matrix significantly can increase the toughness behavior in metal cutting of tools based on alumina or silicon nitride. Even further improvements can be gained with the addition of 3-20 weight-% preferably 5-15 weight-% monoclinic or tetragonal zirconia particles to the alumina based matrix or up to 10 weight-% monoclinic or tetragonal zirconia particles to the silicon nitride based matrix. The alumina based matrix may further comprise chromium in amounts corresponding to a total of 1-20 weight-% as $Cr_2O_3$. The composite may still further comprise refractory nitrides or carbides to increase hot hardness and thermal conductivity which is advantageous in certain metal cutting applications.

The toughening mechanisms are not identified in detail, but probably include other mechanisms than whisker pull out as commonly observed for high strength small diameter whiskers (U.S. Pat. No. 4,543,345). One of the probable mechanisms is crack deflection which will take place if there is a sufficiently weak interface between the disc and the matrix. This mechanism will increase toughness but not strength.

EXAMPLE 1

Cutting tool materials are prepared from the following starting materials:
A. Alumina with a grain size $\leq 1\mu$m.
B. $ZrO_2$ with a grain size $\leq 2\mu$m.
C. SiC-single crystal discs with an average equivalent diameter of 20$\mu$m and average thickness of 1$\mu$m.
D. SiC-single crystal discs with an average equivalent diameter of 60$\mu$m and average thickness of 9$\mu$m.

The composition variants are shown in Table 1.

TABLE 1

| Variant | Composition Weight Percent | | | | |
|---|---|---|---|---|---|
| | A | B | C | D | |
| 1 | bal | 4 | 0 | 0 | prior art |
| 2 | bal | 0 | 24 | 0 | invention |
| 3 | bal | 10 | 24 | 0 | invention |
| 4 | bal | 0 | 0 | 24 | outside invention |

EXAMPLE 2

The materials from Example 1 are tested as inserts SNGN 120412 in cast iron SS 0125 in an interrupted facing operation with high toughness demands. Both mechanical strength and thermal shock resistance are simultaneously tested to a varying degree depending on the cutting conditions used. The following tool life ranking is obtained for different cutting conditions (Table 2).

TABLE 2

| | Tool life resisting for various cutting conditions | | | | |
|---|---|---|---|---|---|
| | Cutting speed m min$^{-1}$ | | | | |
| | 400 | 400 | 700 | 700 | |
| | Feed rate mm rev$^{-1}$ | | | | Total |
| Variant | 0.3 | 0.5 | 0.3 | 0.5 | ranking |
| 1 | 4 | 3 | 4 | 3 | 14 |
| 2 | 1 | 2 | 2 | 2 | 7 |
| 3 | 2 | 1 | 1 | 1 | 6 |
| 4 | 3 | 4 | 3 | 4 | 14 |

As shown from Table 2 large discs outside the preferred embodiment of the invention show an insufficient toughness behaviour at high feed rates.

We claim:

1. A single crystal disc reinforced ceramic cutting tool material characterized by increased toughness behavior in metal cutting applications consisting essentially of a composite defined by a matrix of alumina, 0-20 weight-% zirconia in a monoclinic or a tetragonal phase, 0-20 weight-% $Cr_2O_3$, and having 5-35 weight-% single crystal discs having a diameter of 5-50$\mu$m and a thickness of 0.5-8$\mu$m.

2. A single crystal disc reinforced ceramic cutting tool according to claim 1 wherein the zirconia is present in an amount of from 3-20 weight-%.

3. A single crystal disc reinforced ceramic cutting tool according to claim 1 wherein there is less than 10 weight-% zirconia present.

4. A single crystal disc reinforced ceramic cutting tool according to claim 2 wherein the $Cr_2O_3$ is present in an amount of 1-20 weight-%.

* * * * *